Patented Feb. 28, 1933

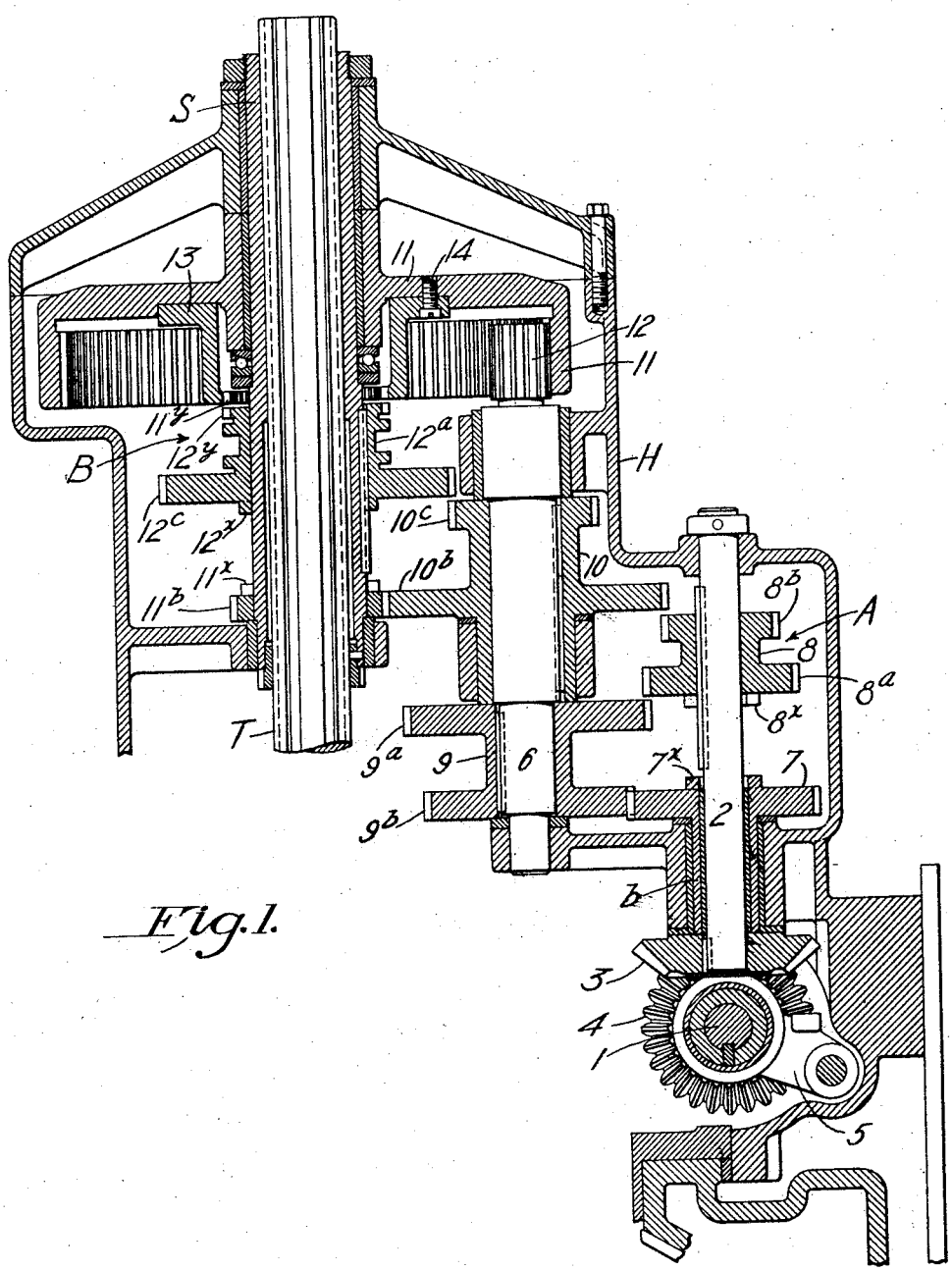

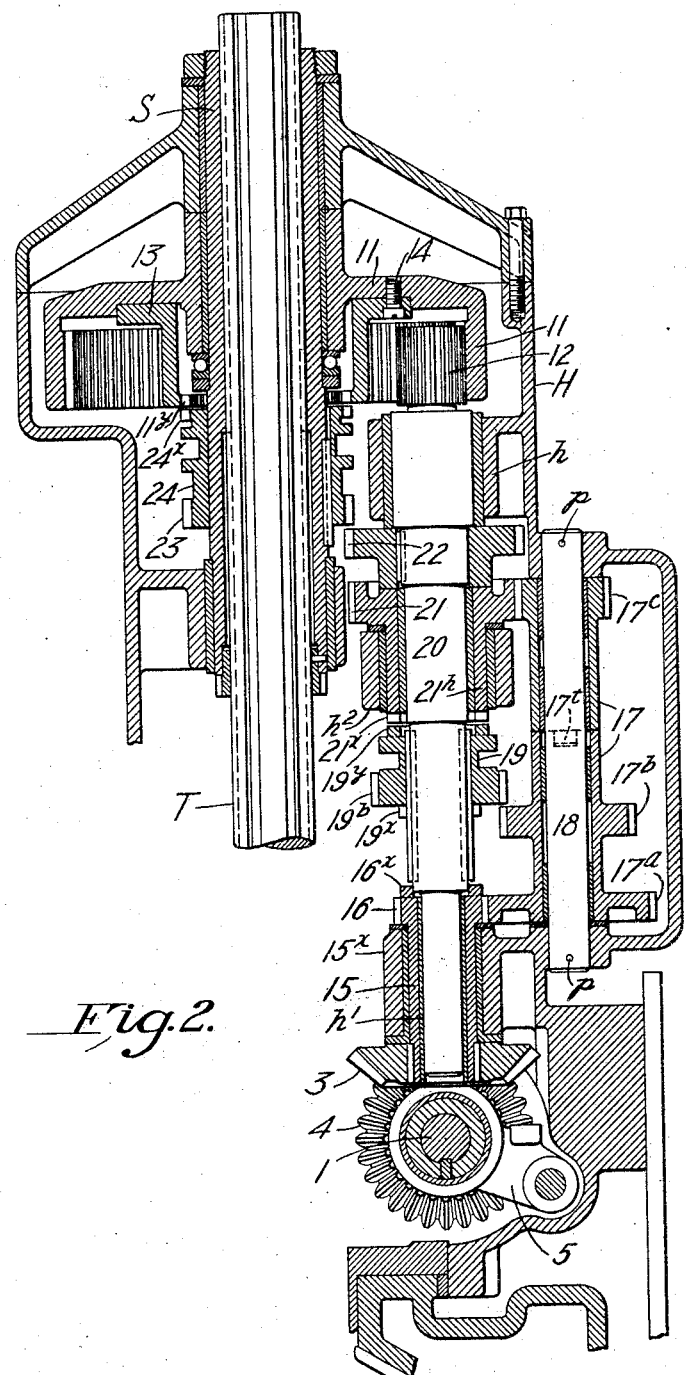

1,899,201

UNITED STATES PATENT OFFICE

DAVID C. KLAUSMEYER, DECEASED, LATE OF CINCINNATI, OHIO, BY H. HENRY SUNDERMANN, EXECUTOR, OF CINCINNATI, OHIO, ASSIGNOR TO THE CINCINNATI BICKFORD TOOL COMPANY, OF CINCINNATI, OHIO, A CORPORATION OF OHIO

INTERNAL GEAR DRIVE

Application filed December 19, 1931. Serial No. 582,012.

This invention relates to driving mechanisms for drill spindles and it has for an object to provide an improved drive capable of being embodied in a drill head and which will afford a considerable number of speed changes covering a wide range of gear ratios.

Heretofore it has been found that slow speeds readily and advantageously may be transmitted to a drill spindle from a rapidly rotating drive shaft, without increasing the gears to an objectionable size, by mounting a relatively large internal gear coaxially with the drill spindle and driving the internal gear by a relatively small pinion. This construction is advantageous in that it places the final drive shaft close to the spindle thereby making the construction compact and yet providing a great reduction in speed between the driving pinion and the slow speed internal gear.

The constructions of this nature, as heretofore provided, have, however, had serious limitations in that they have been capable of affording only about four speeds of rotation in the spindle from a single speed in the main drive shaft. The present invention provides a construction which, although utilizing only three shaft axes, provides as many as nine spindle speeds from a single speed in the arm shaft.

Not only does the present improved construction afford a greater number and a more varied ratio of slow spindle speeds but it provides, in addition, speed increases whereby the tool spindle may be caused to rotate materially faster than the main drive shaft. Stated more specifically, the present construction provides a plurality of spindle speeds from a single speed in the drive shaft varying from a 24 to 1 speed reduction to a 1 to 2 speed increase, all of which is accomplished by the provision of a relatively small number of gears and clutches arranged on only three parallel axes.

The improved construction preferably comprises two serially arranged sets of speed change gears intermediate the drive shaft and the tool spindle. The first gear set affords three speeds between the first driven shaft and the second driven shaft and comprising approximately a 1 to 1 drive and 2 to 1 and 3 to 1 speed reductions. Thus through the first gear set the second driven shaft may be driven at substantially the same rate as the drive shaft and the first driven shaft or at two materially reduced rates.

The second change gear set, which modifies the speeds provided by the first gear set, comprises three pairs of complemental driving and driven gears adapted selectively to be rendered effective to rotate the spindle driving sleeve upon which two of the three driven gears are rotatably journaled. The other driven gear is splined to the spindle sleeve and carries clutch means for selectively locking either of the other two driven gears to the spindle sleeve. The second gear set includes a relatively small driving pinion fixed to the second driven shaft and a relatively large internal gear rotatably journaled on the spindle driving sleeve and permanently meshing with the small pinion. It is through this pinion and internal gear connection that the extremely slow speeds are transmitted to the spindle sleeve.

This invention also contemplates the provision of a modified construction which advantageously may be employed when no increases in speed are required. This modified construction which affords six speeds of rotation in the spindle from a single speed in the arm shaft, to wit:—a 1 to 1 drive and five speed reductions, is disclosed in the drawings and hereinafter will be described.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a vertical sectional view illustrating one embodiment of the improved spindle driving transmission, adapted to transmit to the tool spindle nine speeds of rotation from a single speed in the drive shaft.

Fig. 2 is a vertical sectional view of a modified construction adapted to transmit to the spindle six speeds of rotation from a single speed in the drive shaft.

Referring more specifically to the drawings, and first to Fig. 1, the invention is disclosed as embodied in a drill head, a portion of which is shown in section and designated as H. Extending through the head is a main drive shaft 1, which conveniently may be the usual arm shaft of a radial drill. In the upper portion of the head, there is journaled a spindle driving sleeve S within which is splined, for axial movement, the usual tool spindle T. As hereinbefore stated, this invention is directed to the provision of means for giving to the spindle sleeve, and thereby the spindle, a considerable number of speeds of rotation, covering a wide range, from a single speed in the drive shaft.

This has been accomplished, as shown in Fig. 1, by the provision of two serially arranged speed change devices designated generally as A and B. Each of these speed change devices affords three speeds, thereby rendering available nine speeds in the spindle from a single speed in the drive shaft 1. Within the head H, transverse to the shaft 1, there is journaled a shaft 2 to which is secured a bevel gear 3. This gear is permanently in mesh, at its opposite sides, with similar gears 4 (only one of which is shown) adapted, upon the actuation of a suitable reversing clutch of which the shifter is shown at 5, selectively to be driven by the shaft 1. Alternate clutching of the gears 4 to the drive shaft will effect forward and reverse rotation of the gear 3 and shaft 2 in a manner common to radial drills.

A third shaft 6 also is journaled in the drill head parallel to the shaft 2 and the spindle T and this shaft is adapted to be driven selectively at any one of three speeds from the shaft 2 as now will be described. A gear 7 is rotatably journaled about the shaft 2 on a bushing $b$ and has formed integral with it clutch teeth $7^x$. Splined to the shaft 2 is a shiftable gear-unit 8 having gears $8^a$ and $8^b$ and clutch teeth $8^x$ complemental to the clutch teeth $7^x$ before referred to. It is to be noted that the gear-unit 8 rotates continuously with the shaft 2 whenever that shaft is driven by the drive shaft. In one position of the gear-unit 8 the gear $8^a$ thereof meshes with and drives a gear $9^a$ forming a part of a gear-unit 9 keyed to the shaft 6. In another position of the gear-unit 8 the gear $8^b$ thereof engages and drives a gear $10^b$ forming a part of a second gear-unit 10 keyed to the shaft 6. When the gear-unit 8 is shifted to its lowermost position the clutch teeth $8^x$ thereof engage the clutch teeth $7^x$ on the gear 7, thereby causing that gear to rotate with the shaft 2, thus effecting a drive from the shaft 2 through gear 7 to a gear $9^b$ formed on the gear unit 9. The ratios of the driving gears $8^b$, $8^a$ and 7 to their complemental driven gears $10^b$, $9^a$ and $9^b$ are such that the rate of rotation of the shaft 6 to the shaft 2 is approximately 1 to 3, 1 to 2, and 1 to 1, respectively. The foregoing describes the first speed change device whereby three speeds of rotation are transmitted to the shaft 6 from a single speed in the drive shaft 1.

The second speed change device which triples the speeds available in the shaft 6, will now be described. Rotatably journaled on the spindle sleeve S is a large internal gear permanently in mesh with a small driving pinion 12 fixed to shaft 6. Means, later to be described, is provided for selectively clutching the gear 11 to the spindle sleeve, whereby three speeds may be transmitted from the shaft 6 to the spindle drive sleeve and thereby to the spindle. The gear $10^b$ on the gear unit 10 serves as a driver for a complemental gear $11^b$ rotatably journaled on the spindle sleeve and when this latter gear is clutched to the sleeve three more speeds are transmitted to the sleeve and spindle. Three additional speeds are transmitted from the shaft 6 to the spindle sleeve by a gear $10^c$, forming a part of the gear-unit 10, meshing with a gear $12^c$ provided by a combined gear and clutch element $12^a$ splined to the sleeve S. The member $12^a$ is provided with clutch teeth $12^x$ adapted to engage clutch teeth $11^x$ integral with the gear $11^b$, and with clutch teeth $12^y$ adapted to engage clutch teeth $11^y$ provided by the internal gear 11. By engagement of these clutch teeth the gears 11 and $11^b$ selectively may be caused to rotate the spindle sleeve. For convenience of manufacture the clutch teeth $11^y$ are preferably formed on a cup member 13 suitably secured to the internal gear 11, such, for example, as by screws 14, one only of which is shown.

The ratios of the driving pinion 12 and the driving gears $10^b$ and $10^c$ to the driven gears 11, $11^b$ and $12^c$ are such that together with the ratios of the driving and driven gears of of the change speed mechanism A, the spindle may be driven at any one of nine speeds varying from approximately twice the speed of the drive shaft 1 to approximately one twenty-fourth of the speed thereof.

Fig. 2 shows a modified construction which may be advantageous in machines wherein the rate of rotation of the spindle is not required to be greater than that of the main drive shaft. This construction is similar to that above described in that it includes the head H; the main drive shaft 1 extending therethrough; the main driving and driven gears 4 and 3, respectively, the reversing clutch with its shifter 5; the spindle rotating sleeve S journaled in the head; the large internal gear 11 rotatably journaled on the sleeve, and the tool spindle T splined within the sleeve and axially movable therein. Like the preferred form, this modified construction provides a first three speed speed-change device, but it differs from the preferred form in that the second speed-change device affords only two speed changes instead of the three speed device of the former. Thus with the modified construction six speeds are transmitted to the spindle from a single speed in the drive shaft 1.

In the modified construction the gear 3 is fixed upon a sleeve 15 rotatably journaled in a bearing boss $15^x$ provided by the tool head. The upper end of the sleeve carries a gear 16 and a series of clutch teeth $16^x$. The gear 16 meshes with and drives a gear $17^a$ forming a part of a gear-unit 17 rotatably journaled upon a shaft 18, non-rotatably held in the head H by any suitable means, such, for example, as by pins $p$. For convenience of manufacture the gear-unit is preferably made in two parts which are locked together against relative rotation of a tongue-and-groove connection $17^t$ shown in dotted lines only. Gears $17^b$ and $17^c$ are formed integral with the gear-unit 17 and serve as drivers in the first speed change device. Journaled at one end within a bearing $h$ provided by the head H and at the other end in a bushing $h^1$ within the sleeve 15 is a shaft 20. To this shaft is splined a combined gear and clutch member 19 formed intermediate its ends with a gear $19^b$ adapted to be meshed with the gear $17^b$. At its lower end the member 19 is provided with clutch teeth $19^x$ adapted, in the lowermost position of the member, to engage the clutch teeth $16^x$ on the gear 16 thereby transmitting a 1 to 1 direct drive from the sleeve 15 to the shaft 20. About the shaft 20, and within a bearing boss $h^2$ provided by the drill head, is rotatably journaled the hub $21^h$ of a gear 21 which is permanently in mesh with and driven by the gears $17^c$. The lower end of this hub is formed with clutch teeth $21^x$ adapted to be engaged by complemental clutch teeth $19^y$ on the element 19 thereby to cause the gear 21 to transmit rotation to the shaft 20. The foregoing described the means for selectively transmitting to the shaft 20 any one of three speeds from the shaft 1.

Fixed to the shaft 20 is a pinion 12 permanently in mesh with the internal gear 11, and a gear 22 adapted to be engaged by a gear 23 provided by a combined gear and clutch member 24 splined to the spindle driving sleeve. The member 24 carries, at its upper end, a series of clutch teeth $24^x$ adapted, by shifting the member, to be engaged with complemental clutch teeth $11^y$ carried by the gear 11. Thus by selectively shifting the member 24 downwardly three speeds of rotation may be transmitted to the spindle driving sleeve through the gears 22 and 23 and by shifting it upwardly to engage the clutch teeth $24^x$ and $11^y$ three more speeds may be transmitted to the sleeve by the gear 11.

The ratio of the driving and driven gears is such that the six speeds transmitted to the spindle may vary from approximately the speed of the drive shaft to approximately one twenty-fourth of that speed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A spindle driving transmission for drilling machines comprising a drive shaft; a second shaft arranged with its axis transverse to the axis of the drive shaft and driven thereby; a first gear rotatably journaled on said second shaft; a third shaft journaled parallel to the second shaft; four gears and a pinion fixed to rotate with said third shaft, one of said gears being permanently in mesh with the gear journaled on the second shaft; a gear unit providing second and third gears splined on said second shaft and adapted selectively to be meshed with predetermined ones of the gears on the third shaft; means selectively to clutch said gear unit to said first gear to cause the latter to be rotated; a spindle drive sleeve journaled parallel with said third shaft; a spindle splined within the sleeve; a large internal gear rotatably journaled on said sleeve and meshing with said pinion; a second gear journaled on said sleeve and meshing with one of the gears on the third shaft; and a combined clutch and gear member splined to said sleeve and adapted in one position to clutch said internal gear to the sleeve, in another position to clutch said second gear to the sleeve and in a third position to mesh the gear thereon with one of the gears on the third shaft.

2. A spindle drive mechanism for machine tools comprising a drive shaft; a rotatable spindle-driving sleeve; a relatively large internal gear journaled on said sleeve; a clutch member carried by said internal gear; a second gear rotatably journaled on said sleeve; a clutch member carried by said second gear; a rotatable shaft arranged parallel with said sleeve and driven from said drive shaft; two driving gears and a pinion secured thereto, said pinion being meshed with said internal gear and another of said gears being permanently meshed with said second gear; a gear splined to said sleeve and adapted to be shifted to an intermediate position into mesh with one of the gears on said rotatable shaft; clutch elements carried by said splined gear and adapted in one position thereof to clutch said internal gear to said sleeve and in another position to clutch said second gear to said sleeve.

3. In a drilling machine, in combination, a spindle driving sleeve, an internal gear and an external gear rotatably journaled on said sleeve, a combined gear and clutch element splined to said sleeve, multiple speed gearing arranged for operative connection with said sleeve selectively through said internal gear, said external gear and said splined gear, for selectively effecting relatively slow, fast, and intermediate speeds of rotation in said sleeve, said combined gear and clutch element being shiftable selectively into clutching engagement with said internal and external gear and into driving mesh with a gear of said multiple speed gearing.

4. In a drilling machine, in combination, a drive shaft; a spindle driving sleeve; a plurality of serially arranged speed change devices for rotating said sleeve at any one of more than five speeds from a single speed in the drive shaft, said speed change devices each including shiftable and non-shiftable driving and driven elements adapted selectively to be engaged, one of said speed change devices comprising two driven gears, each provided with a clutch element, rotatably journaled on said sleeve, one of said gears being an internal gear, and a combined gear and clutch element splined to said sleeve, three driving gears two of which are permanently in mesh with said two gears rotatably mounted on the sleeve, said combined gear and clutch element being shiftable selectively to clutch either of said two driven gears to said sleeve or to engage the gear thereof with the third of said driving gears.

5. In a drilling machine, in combination, a drive shaft, a first multiple speed transmission for multiplying the speeds available in said drive shaft, a spindle driving sleeve, a second multiple speed transmission adapted to receive the speeds produced by the first multiple speed transmission, said second transmission comprising an internal gear and an external gear rotatably journaled on said sleeve, a combined gear and clutch element splined to said sleeve, multiple speed gearing arranged for operative connection with said sleeve selectively through said internal gear, said external gear and said splined gear, for selectively effecting relatively slow, fast, and intermediate speeds of rotation in said sleeve, said combined gear and clutch element being shiftable selectively into clutching engagement with said internal and external gear and into driving mesh with a gear of said multiple speed gearing.

6. In a drilling machine, in combination, a drive shaft; a second shaft driven thereby; a first gear rotatably journaled on said second shaft; a third shaft; four gears and a pinion fixed to rotate with said third shaft, one of said gears being permanently in mesh with the gear journaled on the second shaft; a gear unit providing second and third gears splined on said second shaft and adapted selectively to be meshed with predetermined ones of the gears on the third shaft; means selectively to clutch said gear unit to said first gear to cause the latter to be rotated; a spindle drive sleeve; a spindle splined within the sleeve; a large internal gear rotatably journaled on said sleeve and meshing with said pinion; a second gear journaled on said sleeve and meshing with one of the gears on the third shaft; and a member splined to said sleeve and provided at its opposite ends with clutch portions and intermediate its ends with a gear, said member being adapted in one position to clutch said internal gear to the sleeve, in another position to clutch said second gear to the sleeve and in a third position to mesh the gear thereon with one of the gears on the third shaft.

In witness whereof, I have hereunto subscribed my name.

H. HENRY SUNDERMANN,
*Executor of the Last Will and Testament of David C. Klausmeyer, Deceased.*